(12) United States Patent
Hori et al.

(10) Patent No.: US 9,963,139 B2
(45) Date of Patent: May 8, 2018

(54) CONTROL DEVICE FOR VEHICLE

(71) Applicant: Toyota Jidosha Kabushiki Kaisha, Toyota-shi, Aichi-ken (JP)

(72) Inventors: Tetsuo Hori, Toyota (JP); Shunsuke Oyama, Nagakute (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days. days.

(21) Appl. No.: 14/963,882

(22) Filed: Dec. 9, 2015

(65) Prior Publication Data
US 2016/0167639 A1 Jun. 16, 2016

(30) Foreign Application Priority Data

Dec. 10, 2014 (JP) ................... 2014-250425

(51) Int. Cl.
*B60W 20/10* (2016.01)
*B60L 11/18* (2006.01)
(Continued)

(52) U.S. Cl.
CPC ............. *B60W 20/10* (2013.01); *B60K 6/365* (2013.01); *B60K 6/445* (2013.01);
(Continued)

(58) Field of Classification Search
CPC ...... B60W 10/08; B60W 20/00; B60W 20/10; B60W 10/115; B60W 10/06; B60W 10/02; B60W 10/10; B60W 10/11; B60W 10/101; B60W 20/15; B60W 20/40; B60K 6/365; B60K 6/445; B60K 6/547; B60K 6/387; B60K 6/40; B60L 11/123; B60L 11/14; B60L 11/18; B60L 15/20; B60L 2240/421; B60L 2240/423; B60L 2240/441; B60L 2240/443; B60L 2240/486; B60L 2240/507; B60L 2260/26; B60L 2270/145; F16H 2037/0873; F16H 2200/0047; F16H 2200/2012; F16H 3/728; F16H 2200/0043; F16H 2200/201; F16H 61/0437; Y02T 10/6239; Y02T 10/645; Y02T 10/7275; Y02T 10/6217; Y02T 10/7077; Y02T 10/6286; Y02T 10/72; Y02T 477/24;
(Continued)

(56) References Cited

U.S. PATENT DOCUMENTS

2004/0204802 A1* 10/2004 Young ................... A63H 19/24
701/19
2005/0245350 A1* 11/2005 Tabata ................... B60K 6/365
477/34

(Continued)

FOREIGN PATENT DOCUMENTS

JP 2012-091645 A 5/2012
JP 2012-245961 A 12/2012
JP 2013-169852 A 9/2013

*Primary Examiner* — Anne M Antonucci
*Assistant Examiner* — Sanjeev Malhotra
(74) *Attorney, Agent, or Firm* — Dinsmore & Shohl LLP

(57) ABSTRACT

A first electric motor generates torque in the case where a vehicle speed becomes lower than a specified threshold in a travel state where a second electric motor is exclusively used as a drive source among an engine, the first electric motor, and the second electric motor and during a speed reducing travel.

4 Claims, 13 Drawing Sheets

(51) Int. Cl.
*B60K 6/365* (2007.10)
*B60K 6/445* (2007.10)
*F16H 3/72* (2006.01)

(52) U.S. Cl.
CPC .......... *B60L 11/1803* (2013.01); *F16H 3/728* (2013.01); *B60W 2520/10* (2013.01); *B60W 2710/083* (2013.01); *B60Y 2200/92* (2013.01); *F16H 2200/2005* (2013.01); *F16H 2200/2007* (2013.01); *F16H 2200/2033* (2013.01); *F16H 2200/2035* (2013.01); *F16H 2200/2043* (2013.01); *Y02T 10/6239* (2013.01); *Y02T 10/7258* (2013.01); *Y10S 903/906* (2013.01)

(58) Field of Classification Search
CPC ................. Y02T 477/26; Y02T 477/60; F02D 2041/0095; F02D 2200/101; F02D 41/042
USPC ..... 701/59, 66, 19, 22, 70, 101; 180/65.235, 180/65.285; 477/5, 34; 123/339.19
See application file for complete search history.

(56) References Cited

U.S. PATENT DOCUMENTS

| | | | |
|---|---|---|---|
| 2005/0247495 A1* | 11/2005 | Tabata | B60K 6/365 180/65.235 |
| 2009/0118955 A1* | 5/2009 | Tabata | B60W 10/11 701/66 |
| 2009/0248265 A1* | 10/2009 | Tabata | B60K 6/365 701/59 |
| 2009/0250280 A1* | 10/2009 | Abe | B60K 6/26 180/65.285 |
| 2009/0254259 A1* | 10/2009 | The | G01S 19/52 701/70 |
| 2012/0029748 A1 | 2/2012 | Kozarekar et al. | |
| 2013/0180500 A1* | 7/2013 | Nishina | F02D 28/00 123/339.19 |
| 2013/0190133 A1* | 7/2013 | Inoue | B60K 6/48 477/5 |
| 2014/0107903 A1* | 4/2014 | Kawazu | F02D 41/0097 701/101 |
| 2015/0344035 A1* | 12/2015 | O'Brien | B60W 30/192 701/22 |

* cited by examiner

CONTROL DEVICE FOR VEHICLE

INCORPORATION BY REFERENCE

The disclosure of Japanese Patent Application No. 2014-250425 filed on Dec. 10, 2014 including the specification, drawings and abstract is incorporated herein by reference in its entirety.

TECHNICAL FIELD

The present specification relates to a control device for a vehicle (a vehicle power transmission apparatus) and in particular to improvement for suppressing generation of abnormal sound during a speed reducing travel.

BACKGROUND

A vehicle power transmission apparatus that includes a first electric motor, a second electric motor, a transmission member that is coupled to drive wheels and the second electric motor in a manner capable of transmitting power, a differential mechanism for distributing output of an engine to the first electric motor and the transmission member in a power transmission path between the engine and the drive wheels has been known. A technique for filling a backlash in such a vehicle power transmission apparatus in order to suppress generation of abnormal sound and the like has been suggested. For example, a control device for a vehicle that is described in Japanese Patent Application Publication No. 2013-169852 (JP 2013-169852 A) is one example thereof. In this technique, backlash filling torque for filling the backlash between two each of various gears on the power transmission path is output from the first electric motor at a startup in no load states of the first electric motor and the second electric motor. In this way, the generation of the abnormal sound at the startup of the vehicle can be suppressed.

SUMMARY

In the related art, the first electric motor is typically rotated with no load in a travel state where the second electric motor exclusively serves as a drive source among the engine, the first electric motor, and the second electric motor, that is, during an EV travel. However, in the case where a vehicle speed falls within a low vehicle speed range immediately before a stop of the vehicle as a result of a vehicle speed reduction during the EV travel, abnormal sound, such as tooth hammering sound, is possibly generated around the differential mechanism that is coupled to the first electric motor because of cogging torque or the like in the first electric motor, for example. Such a problem was newly discovered in a process of a continuous earnest study by the present inventors with an intention of improving performance of the vehicle power transmission apparatus.

The present specification provides a control device for a vehicle (a vehicle power transmission apparatus) that suppresses generation of abnormal sound during a speed reducing travel.

A control device for a vehicle in one aspect of the present specification, the vehicle including an engine, drive wheels, a first electric motor provided in a power transmission path between the engine and the drive wheels, a second electric motor provided in the power transmission path, a transmission member provided in the power transmission path, the transmission member coupled to the drive wheels and the second electric motor such that power is transmitted thereto, and a differential mechanism provided in the power transmission path, the differential mechanism configured to distribute output of the engine to the first electric motor and the transmission member, the control device includes an electronic control unit configured to cause the first electric motor to generate torque in the case where a vehicle speed becomes lower than a specified threshold in a travel state where the second electric motor is exclusively used as a drive source among the engine, the first electric motor, and the second electric motor and during a speed reducing travel.

According to the above aspect, the first electric motor generates the torque in the case where the vehicle speed becomes lower than the specified threshold in the travel state where the second electric motor is exclusively used as the drive source among the engine, the first electric motor, and the second electric motor and during the speed reducing travel. Accordingly, the vehicle speed is reduced during an EV travel. In addition, a backlash is filled by the torque that is output from the first electric motor in the case where the vehicle speed falls within a low vehicle speed range immediately before a stop of the vehicle. Thus, generation of abnormal sound, such as tooth hammering sound, can be suppressed. That is, the control device for a vehicle power transmission apparatus that suppresses the generation of the abnormal sound during the speed reducing travel can be provided.

The electronic control unit may be configured to i) cause the first electric motor to generate the torque in a positive rotational direction in the case where a start of the engine is predicted during a forward travel in which the second electric motor is used as the drive source, and ii) cause the first electric motor to generate the torque in a negative rotational direction in the case where the start of the engine is not predicted. According to such a configuration, a direction of the torque that is output from the first electric motor can correspond to a direction of the torque during cranking of the engine in the case where the start of the engine is predicted. Thus, in addition to the suppression of the generation of the abnormal sound at the start of the engine, the engine can promptly be started. In addition, in the case where the engine is not started, the direction of the torque that is output from the first electric motor can correspond to an application direction of the torque to the drive wheels by the second electric motor. Thus, energy loss of the electric motor can be suppressed.

The electronic control unit may be configured to cause the first electric motor to generate the torque in the positive rotational direction during a reverse travel in which the second electric motor is used as the drive source. According to such a configuration, in the case where the first electric motor outputs the torque during the reverse travel in which the second electric motor is used as the drive source, the torque in the positive rotational direction is generated. In this way, the direction of the torque that is output from the first electric motor can correspond to the application direction of the torque to the drive wheels by the second electric motor. Thus, the energy loss of the electric motor can be suppressed.

BRIEF DESCRIPTION OF THE DRAWINGS

Features, advantages, and technical and industrial significance of exemplary embodiments of the present specification will be described below with reference to the accompanying drawings, in which like numerals denote like elements, and wherein.

DETAILED DESCRIPTION OF EMBODIMENTS

Figure 1:
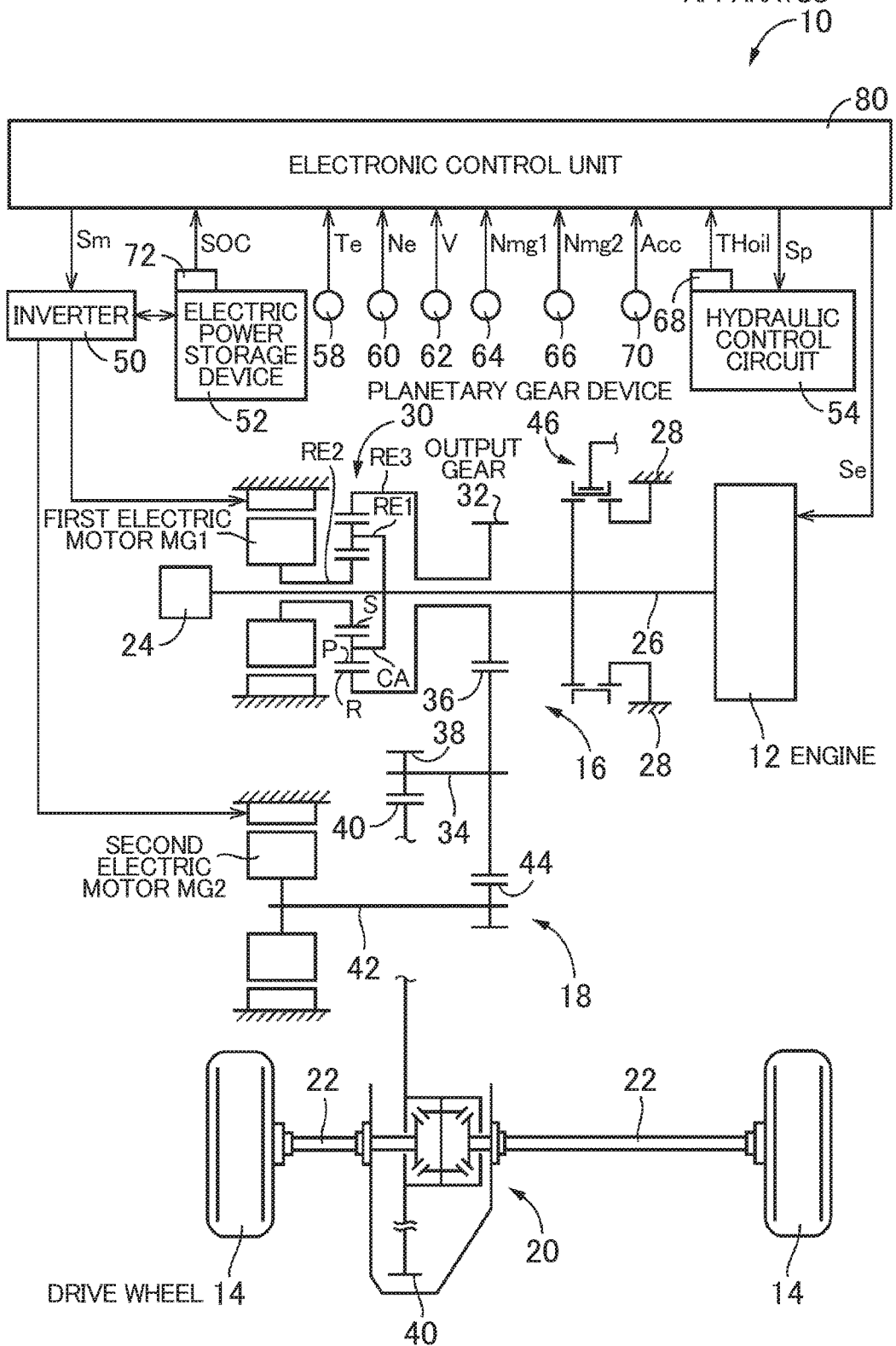
FIG. 1 is a view for illustrating a schematic configuration of a vehicle power transmission apparatus.

A detailed description will hereinafter be made on embodiments of the present specification on the basis of the drawings. In the drawings that are used for the following description, a dimensional ratio and the like of each component are not necessarily illustrated accurately.

FIG. 1 is a block diagram for illustrating a schematic configuration of a vehicle power transmission apparatus 10 (hereinafter simply referred to as a power transmission apparatus 10) and also for illustrating main sections of a control system that is provided to control each section of the power transmission apparatus 10. As shown in FIG. 1, the power transmission apparatus 10 is a horizontally-arranged apparatus that is used for an FF (front-engine front-wheel-drive) vehicle and the like, for example, and is configured by including a first drive section 16, a second drive section 18, a differential gear device 20, a right and left pair of axles 22, and the like in a power transmission path between an engine 12 and a right and left pair of drive wheels 14. The power transmission apparatus 10 includes an oil pump 24 for generating hydraulic pressure that serves as source pressure of a hydraulic control circuit 54 when rotationally driven by the engine 12 and for supplying a lubricant to the first drive section 16, the second drive section 18, and the like. The power transmission apparatus 10 includes a meshing clutch (a dog clutch) 46 for fixing a crankshaft 26 of the engine 12 to a housing 28 as a non-rotation member. This meshing clutch 46 does not always have to be provided.

The first drive section 16 is configured by including a first electric motor MG1, a planetary gear device 30, and an output gear 32. The planetary gear device 30 is a known planetary gear device of a single pinion type that includes a sun gear S, a ring gear R, and a carrier CA as three rotation elements (rotation members). The sun gear S is coupled to a rotor of the first electric motor MG1. The ring gear R meshes with the sun gear S via a pinion gear P and functions as an output rotation element that is coupled to the drive wheels 14 in a manner capable of transmitting power. The carrier CA is a rotation element that is selectively coupled to the housing 28 by an engaging operation (a locking operation) of the meshing clutch 46 and supports the pinion gear P in a manner to allow rotation and revolution thereof.

In the planetary gear device 30, the carrier CA is coupled to the crankshaft 26 as an input shaft of the first drive section 16. The ring gear R is coupled to the output gear 32. The output gear 32 meshes with a large-diameter gear 36 that is integrally provided with an intermediate output shaft 34 provided in parallel with the crankshaft 26. A small-diameter gear 38 that is integrally provided with the intermediate output shaft 34 meshes with a differential input gear 40 of the differential gear device 20. That is, the output gear 32 (the ring gear R) corresponds to a transmission member in this embodiment. The planetary gear device 30 functions as a differential mechanism for distributing output of the engine 12 to the first electric motor MG1 and the output gear 32 as the transmission member. The planetary gear device 30 is a power distribution mechanism that includes: the carrier CA as a first rotation element RE1 that is an input rotation member and is coupled to the engine 12; the sun gear S as a second rotation element RE2; and the ring gear R as a third rotation element RE3 that is an output rotation member and that distributes the power output from the engine 12 to the first electric motor MG1 and the output gear 32, and functions as an electric continuously variable transmission.

The second drive section 18 is configured by including a second electric motor MG2 and a second output gear 44. The second output gear 44 is coupled to a second electric motor output shaft 42 as an output shaft of the second electric motor MG2. The second output gear 44 meshes with the large-diameter gear 36. In this way, the second electric motor MG2 is coupled to the drive wheels 14 in a manner capable of transmitting the power. The output gear 32 as the transmission member is coupled to the drive wheels 14 and the second electric motor MG2 in the manner capable of transmitting the power.

The engine 12 is an internal combustion engine, such as a gasoline engine, for generating drive power by combusting fuel, such as gasoline, that is injected into a cylinder, for example. The first electric motor MG1 and the second electric motor MG2 are each a motor generator that has a function as a motor for generating the drive power and a generator for generating a reaction force. However, the first electric motor MG1 at least has a function as the generator, and the second electric motor MG2 at least has a function as the motor. The first electric motor MG1 and the second electric motor MG2 are each connected to an electric power storage device 52 via an inverter unit 50.

In the power transmission apparatus 10 that is configured as described above, the power that is output from the engine 12 or the first electric motor MG1 as a power source in the first drive section 16 is transmitted to the output gear 32 via the planetary gear device 30, and is further transmitted to the differential input gear 40 of the differential gear device 20 via the large-diameter gear 36 and the small-diameter gear 38 that are provided on the intermediate output shaft 34. The power that is output from the second electric motor MG2 as a power source in the second drive section 18 is transmitted to the large-diameter gear 36 via the second electric motor output shaft 42 and the second output gear 44, and is further transmitted to the differential input gear 40 via the small-diameter gear 38. That is, any of the engine 12, the first electric motor MG1, and the second electric motor MG2 can be used as a drive source for travel in the power transmission apparatus 10.

The meshing clutch 46 is a known hydraulic-type engaging device that is brought into an engaged state or a disengaged state in accordance with the hydraulic pressure. The meshing clutch 46 is brought into a locked state for fixing (locking) the crankshaft 26 of the engine 12 to the housing 28 when being engaged in accordance with the hydraulic pressure, which is supplied from the hydraulic control circuit 54, or the like, for example. In addition, the meshing clutch 46 is brought into an unlocked state for permitting rotation of the crankshaft 26 with respect to the housing 28 when being disengaged in accordance with the hydraulic pressure, which is supplied from the hydraulic control circuit 54, or the like.

The power transmission apparatus 10 includes an electronic control unit 80. This electronic control unit 80 includes a so-called microcomputer that includes a CPU, a RAM, a ROM, an input/output interface, and the like, for example. The CPU executes various types of control of the power transmission apparatus 10 by processing a signal in accordance with a program that is stored in the ROM in advance while using a temporary storage function of the RAM. The electronic control unit 80 executes vehicle control such as hybrid drive control that is related to the engine 12, the first electric motor MG1, the second electric motor MG2, and the like, for example, and is configured by being divided into a section for output control of the engine 12, a section for output control of the first electric motor MG1, a section for output control of the second electric motor MG2, and the like as necessary. In this embodiment, the electronic control unit 80 corresponds to a control device for the power transmission apparatus 10.

The electronic control unit 80 is supplied with signals based on detection values by various sensors that are provided in sections of the power transmission apparatus 10. Each of the signals is detected by the each sensor when needed and is supplied to the electronic control unit 80. Examples of the signals include: a signal indicative of a temperature of a coolant of the engine 12 (an engine coolant temperature) Te from an engine coolant temperature sensor 58; a signal indicative of a speed Ne of the engine 12 from an engine speed sensor 60; a signal indicative of an output rotational speed Nout as a rotational speed of the output gear 32 that corresponds to a vehicle speed V from an output rotational speed sensor 62; a signal indicative of a rotational speed Nmg1 of the first electric motor MG1 from a first electric motor rotational speed sensor 64, such as a resolver; a signal indicative of a rotational speed Nmg2 of the second electric motor MG2 from a second electric motor rotational speed sensor 66, such as a resolver; a signal indicative of a hydraulic oil temperature THoil as a temperature of hydraulic oil, which also serves as the lubricant of the first drive section 16 and the like, from an oil temperature sensor 68; a signal indicative of an accelerator operation amount Acc that corresponds to an operation amount of an unillustrated accelerator pedal from an accelerator operation amount sensor 70; a signal indicative of a state of charge (charging capacity) SOC of the electric power storage device 52 from a battery sensor 72; and the like.

The electronic control unit 80 outputs various command signals for respectively controlling actuation of the devices that are provided in the power transmission apparatus 10. For example, an engine control command signal Se for controlling driving of the engine 12 is output to an igniter, a fuel injector, an electronic throttle valve, and the like that are provided in the engine 12 and are not shown. An electric motor control command signal Sm for controlling the actuation of the first electric motor MG1 and that of the second electric motor MG2 is output to the inverter unit 50. A hydraulic pressure control command signal Sp for controlling the hydraulic pressure output from the hydraulic control circuit 54 is output to an electromagnetic control valve and the like that are provided in the hydraulic control circuit 54 and are not shown.

Figure 2:
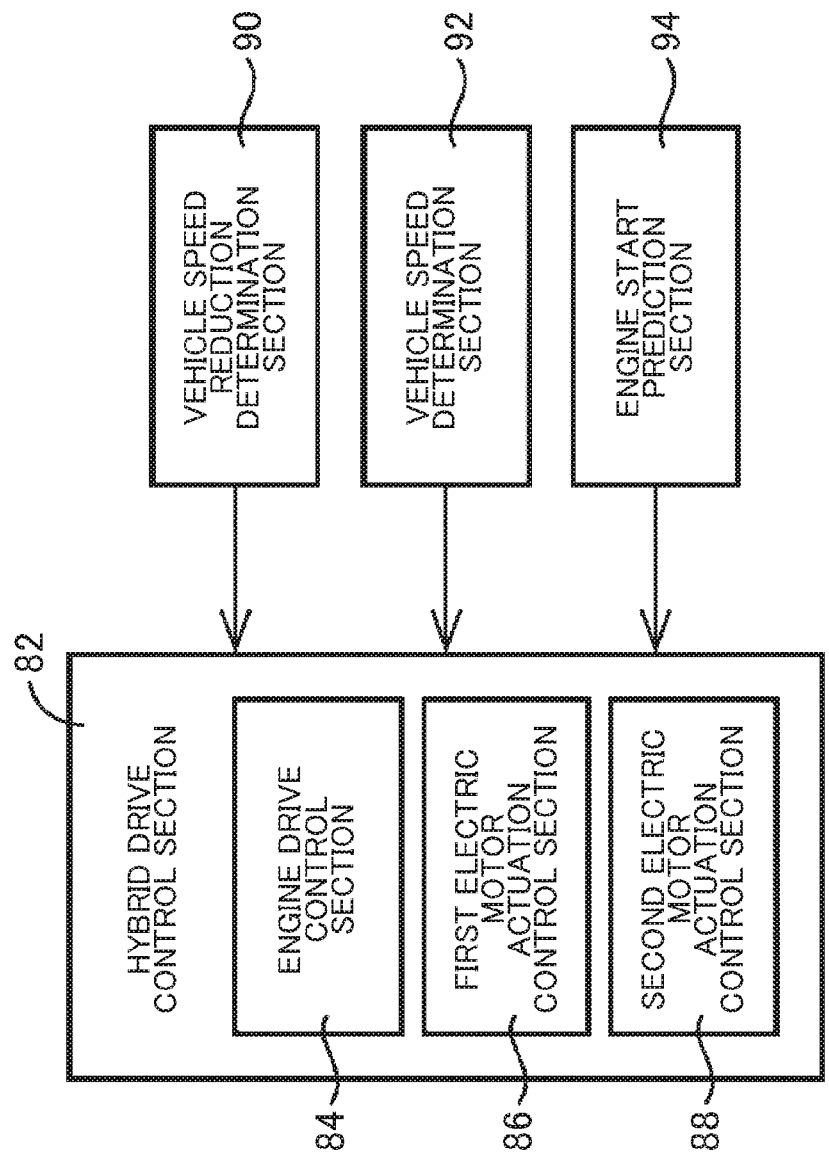
FIG. 2 is a functional block diagram for illustrating main sections of one example of a control function that is provided in an electronic control unit of the vehicle power transmission apparatus in FIG. 1.

FIG. 2 is a functional block diagram for illustrating main sections of one example of a control function that is provided in the electronic control unit 80. Any of a hybrid drive control section 82, a vehicle speed reduction determination section 90, a vehicle speed determination section 92, and an engine start prediction section 94 shown in this FIG. 2 is functionally provided in the electronic control unit 80. However, some or all of those may be provided as separate control sections from the electronic control unit 80 and may realize control, which will be described in detail below, by transmitting information from/to each other.

The hybrid drive control section 82 executes the hybrid drive control in the power transmission apparatus 10 by controlling the actuation of the engine 12, that of the first electric motor MG1, and that of the second electric motor MG2. For this reason, the hybrid drive control section 82 includes an engine drive control section 84, a first electric motor actuation control section 86, and a second electric motor actuation control section 88. The engine drive control section 84 outputs the engine control command signal Se for controlling opening/closing of the electronic throttle valve, a fuel injection amount, ignition timing, and the like, for example, and executes the output control of the engine 12 so as to be able to achieve a target value of engine torque Te for generating target engine power Pe*. The first electric motor actuation control section 86 outputs the electric motor control command signal Sm for controlling the actuation of the first electric motor MG1 to the inverter unit 50 and controls the actuation of the first electric motor MG1, so as to be able to achieve a target value of first electric motor torque Tmg1. The second electric motor actuation control section 88 outputs the electric motor control command signal Sm for controlling the actuation of the second electric motor MG2 to the inverter unit 50 and controls the actuation of the second electric motor MG2, so as to be able to achieve a target value of second electric motor torque Tmg2.

More specifically, the hybrid drive control section 82 computes requested drive torque that is drive torque requested at the current vehicle speed V from the accelerator operation amount Acc as a requested drive amount, and causes at least one of the engine 12, the first electric motor MG1, and the second electric motor MG2 to generate the requested drive torque such that an operation with low fuel consumption and a small exhaust gas amount can be realized in consideration of a requested charging value (requested charging power) and the like. For example, the hybrid drive control section 82 selectively establishes an EV travel mode (a motor travel mode), an engine travel mode (a normal travel mode), and an assist travel mode (an acceleration travel mode), and the like in accordance with a travel state. In the EV travel mode, an EV travel (a motor travel) is made by stopping the operation of the engine 12 and using at least one of the first electric motor MG1 and the second electric motor MG2 as a travel drive source. In the engine travel mode, engine direct torque is transmitted to the output gear 32 by generating the reaction force with respect to the power of the engine 12 by the first electric motor MG1, and the torque is transmitted to the drive wheels 14 by driving the second electric motor MG2 by using generated electric power of the first electric motor MG1, so as to make an engine travel by using at least the engine 12 as the travel drive source. In the engine travel mode, the assist travel mode is established by further adding the drive torque of the second electric motor MG2 that is generated by using the electric power from the electric power storage device 52 for a travel.

The hybrid drive control section 82 establishes the EV travel mode in the case where the requested drive torque falls within an EV travel range that is lower than a threshold, the threshold being computed and stored (that is, predetermined) in advance from an experiment or in terms of design. The hybrid drive control section 82 establishes the engine travel mode or the assist travel mode in the case where the requested drive torque falls within an engine travel range that is at least equal to the threshold. In the EV travel mode, either a concurrent mode in which the vehicle can run by concurrently using the first electric motor MG1 and the second electric motor MG2 as the travel drive sources or an exclusive mode in which the vehicle runs by exclusively using the second electric motor MG2 is established. That is, in this embodiment, the exclusive mode in the EV travel mode corresponds to a travel state where the second electric motor MG2 is exclusively used as the drive source among the engine 12, the first electric motor MG1, and the second electric motor MG2. In the EV travel mode, the locked state where the meshing clutch 46 is engaged and the crankshaft 26 of the engine 12 is fixed (locked) to the housing 28 as the non-rotation member is set. However, the locked state may not necessarily be set in the EV travel mode.

The vehicle speed reduction determination section 90 determines whether the vehicle, to which the power transmission apparatus 10 is applied, is in a speed reducing travel. The vehicle speed reduction determination section 90 determines whether the vehicle is in the speed reducing travel in a travel state where the second electric motor MG2 is exclusively used as the drive source among the engine 12, the first electric motor MG1, and the second electric motor MG2, that is, during a travel in the exclusive mode by the EV travel mode. More specifically, the vehicle speed reduction determination section 90 determines whether the vehicle is in the speed reducing travel on the basis of a temporal change rate of the vehicle speed V that corresponds to the output rotational speed Nout detected by the output rotational speed sensor 62. For example, if the temporal change rate of an absolute value of the vehicle speed V has a negative value, it is determined that the vehicle is in the speed reducing travel. Alternatively, the vehicle speed reduction determination section 90 may determine whether the vehicle is in the speed reducing travel on the basis of the accelerator operation amount Acc that is detected by the accelerator operation amount sensor 70, presence or absence of a depressing operation of a foot brake pedal that is detected by an unillustrated brake sensor, or the like. For example, if the accelerator operation amount Acc is zero and the brake operation is performed, it is determined that the vehicle is in the speed reducing travel.

The vehicle speed determination section 92 determines whether the absolute value of the vehicle speed V of the vehicle, to which the power transmission apparatus 10 is applied, is lower than a specified threshold. The vehicle speed determination section 92 determines whether the absolute value of the vehicle speed V of the vehicle is lower than the specified threshold in the case where the determination by the vehicle speed reduction determination section 90 is positive, that is, in the case where it is determined that the vehicle is in the speed reducing travel. More specifically, the vehicle speed determination section 92 determines that whether the absolute value of the vehicle speed V that corresponds to the output rotational speed Nout detected by the output rotational speed sensor 62 is lower than an absolute value of a predetermined vehicle speed A immediately before the stop of the vehicle. In other words, the vehicle speed determination section 92 determines whether the absolute value of the vehicle speed V falls within a range immediately before the stop of the vehicle, which is a speed range higher than zero and lower than the absolute value of the vehicle speed A immediately before the stop of the vehicle, due to the speed reduction of the vehicle.

The engine start prediction section 94 determines whether the start of the engine 12 is predicted. That is, the engine start prediction section 94 determines whether transition from a state where the operation of the engine 12 is stopped, such as the EV travel mode, to a state where the engine 12 is driven is predicted. The engine start prediction section 94 determines whether the start of the engine 12 is predicted from a predetermined relationship based on the coolant temperature Te of the engine 12 that is detected by the engine coolant temperature sensor 58, the state of charge (the charging capacity) SOC of the electric power storage device 52 that is detected by the battery sensor 72, the requested drive torque, the requested charging value, or the like. For example, it is determined that the start of the engine 12 is predicted in the case where the coolant temperature Te of the engine 12 that is detected by the engine coolant temperature sensor 58 becomes lower than a specified threshold Tbo. However, it is determined that the start of the engine 12 is not predicted in the case where the coolant temperature Te of the engine 12 is at least equal to the specified threshold Tbo. It is determined that the start of the engine 12 is predicted in the case where the state of charge SOC of the electric power storage device 52 that is detected by the battery sensor 72 becomes lower than a specified threshold SOCbo. However, it is determined that the start of the engine 12 is not predicted in the case where the state of charge SOC of the electric power storage device 52 is at least equal to the specified threshold SOCbo. It is determined that the start of the engine 12 is predicted in the case where the requested drive torque that is computed by the hybrid drive control section 82 becomes at least equal to a specified threshold. However, it is determined that the start of the engine 12 is not predicted in the case where the requested drive torque is lower than the specified threshold. It is determined that the start of the engine 12 is predicted in the case where the requested charging value that is computed by the hybrid drive control section 82 becomes at least equal to a specified threshold. However, it is determined that the start of the engine 12 is not predicted in the case where the requested charging value is lower than the specified threshold. The engine start prediction section 94 may determine whether the start of the engine 12 is predicted by combinedly making the above determinations.

The hybrid drive control section 82 causes the first electric motor MG1 to generate the torque via the first electric motor actuation control section 86 in the case where the absolute value of the vehicle speed V becomes lower than the specified threshold in the travel state where the second electric motor MG2 is exclusively used as the drive source among the engine 12, the first electric motor MG1, and the second electric motor MG2 and during the speed reducing travel. That is, in the case where both of the determinations by the vehicle speed reduction determination section 90 and the vehicle speed determination section 92 are positive, the hybrid drive control section 82 causes the first electric motor MG1 to generate the torque. This torque is preferably backlash filling torque that is computed in advance by an experiment or the like and thus is defined in order to fill a backlash in a configuration around the first electric motor MG1, and is preferably a specified value (a constant value). However, this torque may be a value that is changed in accordance with the vehicle speed V or the like. In other words, in the case where the absolute value of the vehicle speed V falls within the range immediately before the stop of the vehicle, which is the speed range higher than zero and lower than the absolute value of the vehicle speed A immediately before the stop of the vehicle, due to the speed reduction of the vehicle during the travel in the exclusive mode in the EV travel mode, the hybrid drive control section 82 controls the operation of the first electric motor MG1 via the first electric motor actuation control section 86 such that the specified backlash filling torque is output from the first electric motor MG1.

Figure 3:
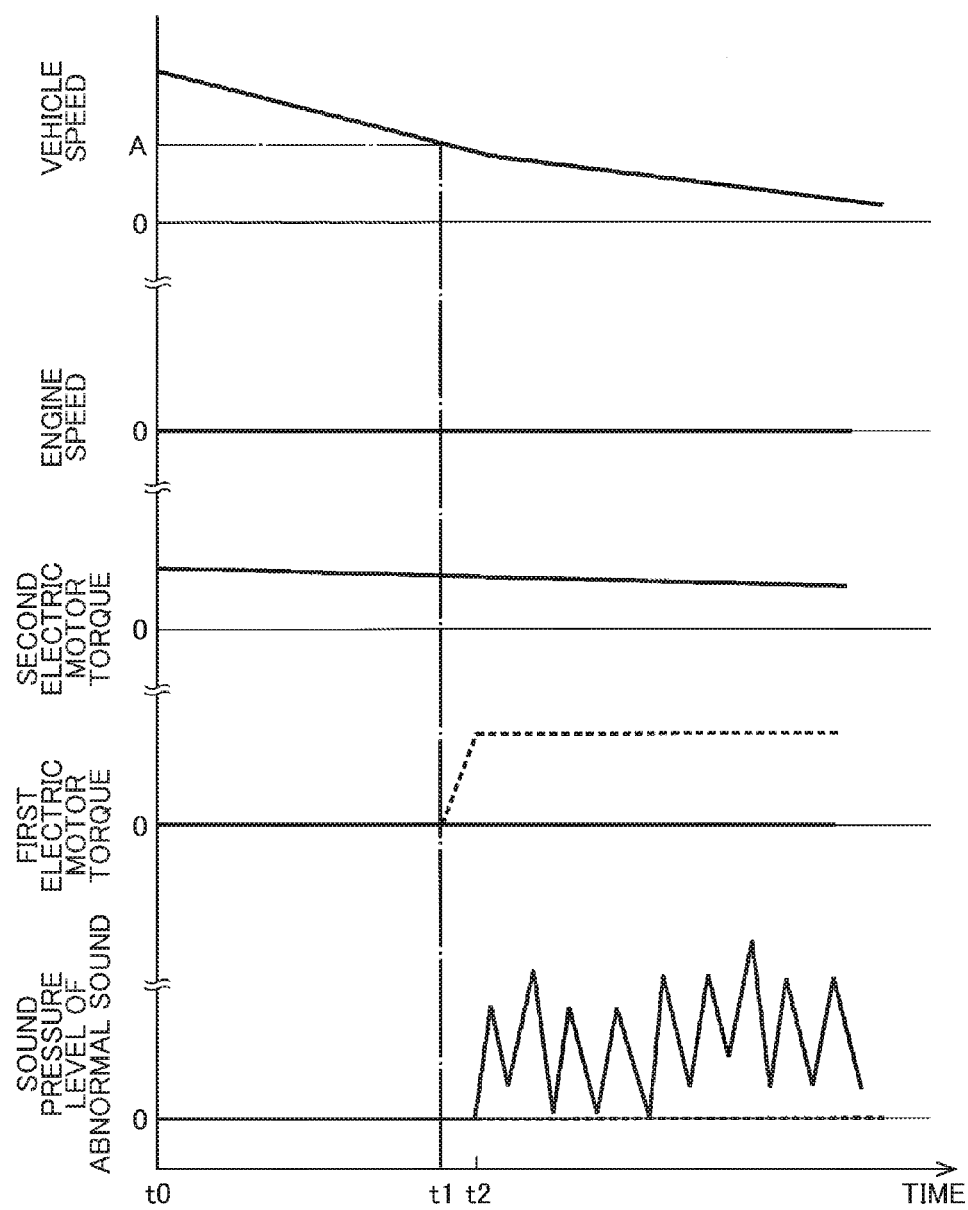
FIG. 3 is a time chart for illustrating one example of control in this embodiment during a forward travel that is executed by the electronic control unit in FIG. 2.

FIG. 3 is a time chart for illustrating one example of the control in this embodiment in the case where the vehicle speed V becomes lower than the vehicle speed A immediately before the stop of the vehicle due to the speed reduction of the vehicle during a forward travel in the exclusive mode in the EV travel mode. In FIG. 3, a waveform that corresponds to conventional control is represented by a solid line, while a waveform that corresponds to the control in this embodiment is represented by a broken line. In the control shown in FIG. 3, the travel in the exclusive mode in the EV travel mode, that is, the travel in which the second electric motor MG2 is exclusively used as the drive source among the engine 12, the first electric motor MG1, and the second electric motor MG2 is made. That is, the engine 12 is stopped, and the speed Ne thereof is zero. Preferably, the locked state where the meshing clutch 46 is engaged and thus the crankshaft 26 of the engine 12 is fixed (locked) to the housing 28 as the non-rotation member is set. From a time point t0 to a time point t1, the first electric motor torque Tmg1 that is output from the first electric motor MG1 is zero. That is, the first electric motor MG1 is rotated with no load. The second electric motor torque Tmg2 that is output from the second electric motor MG2 as the drive source is linearly decreased, and the vehicle speed V is gradually decreased. That is, the speed reducing travel is made. At the time point t1, the vehicle speed V becomes lower than the vehicle speed A immediately before the stop of the vehicle due to the speed reduction of the vehicle. That is, the vehicle speed V falls within the range immediately before the stop of the vehicle, which is the speed range lower than the vehicle speed A immediately before the stop of the vehicle.

In the conventional control indicated by the solid line in FIG. 3, the first electric motor torque Tmg1 remains zero even after the vehicle speed V obtains a value that falls within the range immediately before the stop of the vehicle at the time point t1. In this case, in the conventional control, tooth hammering sound (rattling sound) is generated around the planetary gear device 30 that is coupled to the first electric motor MG1 due to cogging torque in the first electric motor MG1, for example, near a time point t2. Meanwhile, in the control of this embodiment indicated by the broken line in FIG. 3, the first electric motor torque Tmg1 is increased after the vehicle speed V obtains the value that falls within the range immediately before the stop of the vehicle at the time point t1. Then, after the first electric motor torque Tmg1 is increased to a specified value at the time point t2, such torque is maintained. This torque corresponds to the backlash filling torque for filling the backlash in a configuration around the planetary gear device 30 that is coupled to the first electric motor MG1. In the control of this embodiment, in the case where the vehicle speed V obtains the value that falls within the range immediately before the stop of the vehicle, the backlash filling torque is output from the first electric motor MG1 (such torque is applied by the first electric motor MG1). In this way, the generation of the tooth hammering sound around the planetary gear device 30 can be suppressed.

In the case where the absolute value of the vehicle speed V becomes lower than the absolute value of the vehicle speed A immediately before the stop of the vehicle due to the speed reduction of the vehicle during the forward travel in the exclusive mode in the EV travel mode, the hybrid drive control section 82 preferably generates torque in a positive rotational direction (a positive direction) by the first electric motor MG1 when the start of the engine 12 is predicted, and the hybrid drive control section 82 preferably generates torque in a negative rotational direction (a negative direction) by the first electric motor MG1 when the start of the engine 12 is not predicted. The hybrid drive control section 82 preferably generates the torque in the positive rotational direction (the positive direction) by the first electric motor MG1 in the case where the absolute value of the vehicle speed V becomes lower than the absolute value of the vehicle speed A immediately before the stop of the vehicle during a reverse travel in the exclusive mode in the EV travel mode. In this embodiment, the torque in the positive rotational direction in the first electric motor MG1 is torque in an upward direction in collinear diagrams of FIG. 4, FIG. 5, and the like, which will be described below, and is torque that causes the vehicle to generate the drive power in a reverse travel (reverse) direction in the case where the torque is output from the first electric motor MG1 in a state where the operation of the engine 12 is stopped due to the engagement of the meshing clutch 46 or the like, for example. The torque in the negative rotational direction in the first electric motor MG1 is torque in a downward direction in the collinear diagrams of FIG. 4, FIG. 5, and the like, which will be described below, and is torque that causes the vehicle to generate the drive power in a forward travel direction in the case where the torque is output from the first electric motor MG1 in the state where the operation of the engine 12 is stopped due to the engagement of the meshing clutch 46 or the like, for example. Hereinafter, a description will be made on the torque that is output from the first electric motor MG1 in accordance with whether the start of the engine 12 is predicted by using FIG. 4 to FIG. 7 and FIG. 12.

Figure 4:
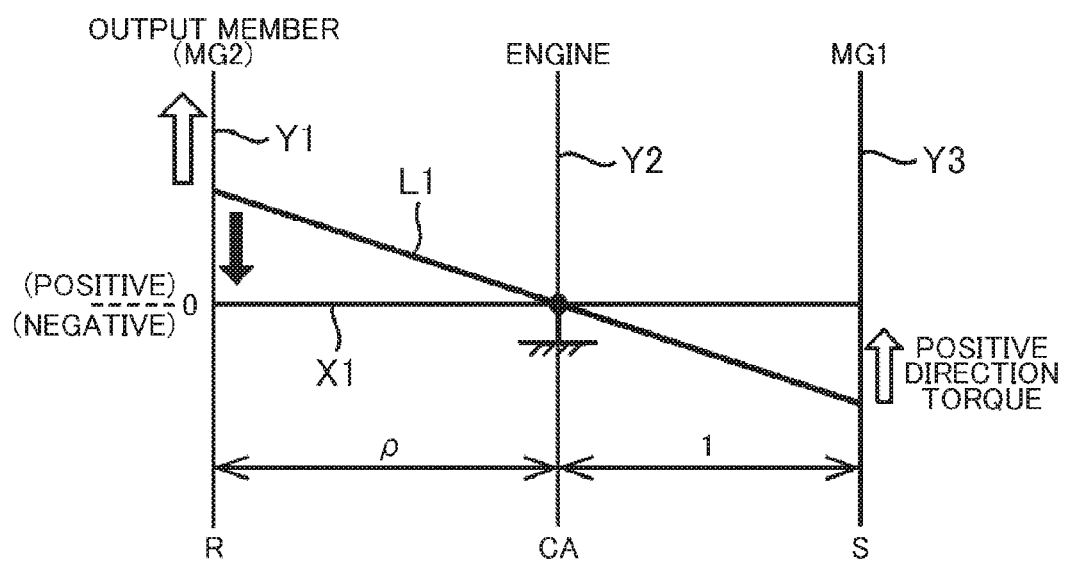
FIG. 4 is a collinear diagram for illustrating the control in this embodiment in the case where a vehicle speed becomes lower than a predetermined value due to speed reduction of a vehicle during the forward travel by an EV travel and thus an engine start is predicted.
Figure 5:
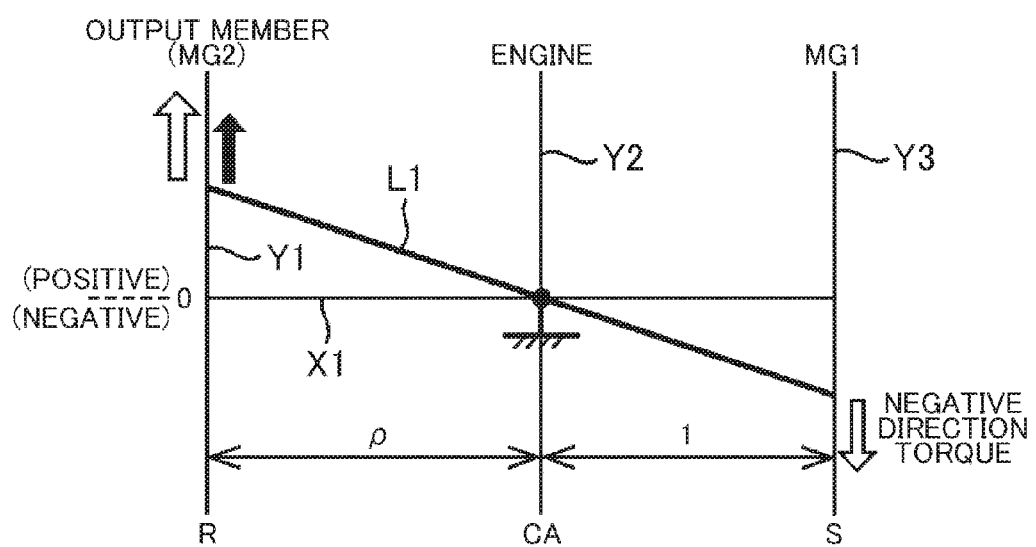
FIG. 5 is a collinear diagram for illustrating the control in this embodiment in the case where the vehicle speed becomes lower than the predetermined value due to the speed reduction of the vehicle during the forward travel by the EV travel and the engine start is not predicted.
Figure 12:
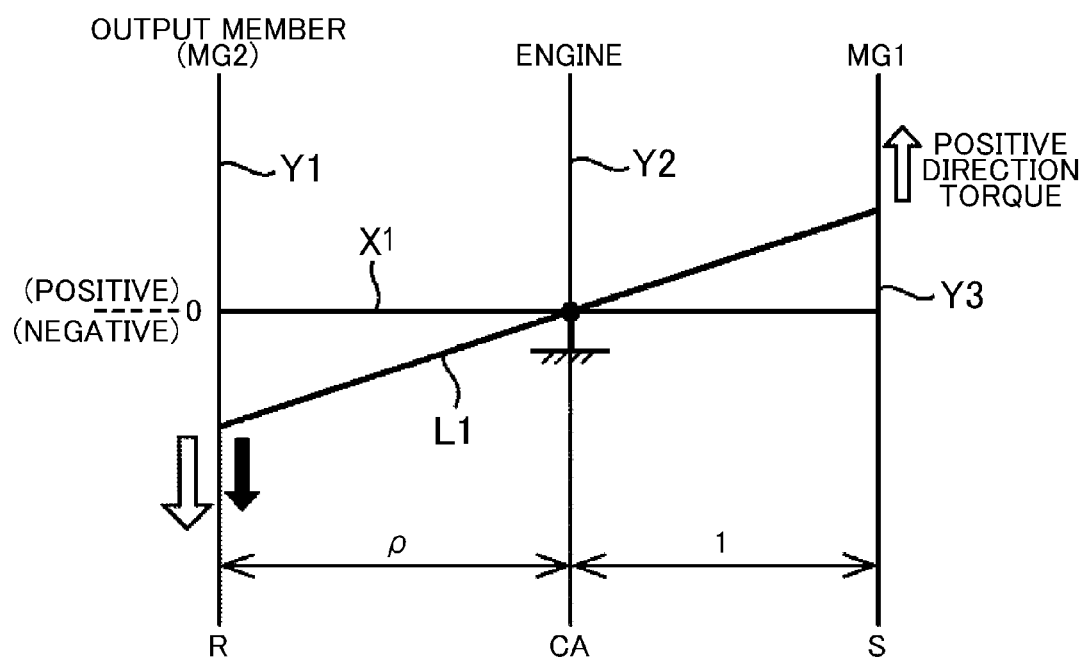
FIG. 12 is a collinear diagram for illustrating the control in this embodiment in the case where the vehicle speed becomes lower than the predetermined value due to the speed reduction of the vehicle during a reverse travel by the EV travel.

Each of FIG. 4, FIG. 5, and FIG. 12 shows a collinear diagram in which relative relationships of rotational speeds of the rotation elements in the planetary gear device 30 can be represented by a straight line, the planetary gear device 30 being the differential mechanism that is coupled to the first electric motor MG1 in the power transmission apparatus 10. Each of FIG. 4, FIG. 5, and FIG. 12 is a two-dimensional coordinates in which a relative relationship of a gear ratio ρ of the planetary gear device 30 is indicated in a horizontal axis direction while a relative rotational speed is indicated in a vertical axis direction. Each of the rotational speeds is represented with a rotational direction of the ring gear R during the forward travel of the vehicle being the positive direction (positive rotation). A horizontal line X1 indicates the rotational speed of zero. Vertical lines Y1 to Y3 sequentially indicate the relative rotational speeds. From the left, Y1 indicates the relative rotational speed of the ring gear R of the planetary gear device 30, Y2 indicates the relative rotational speed of the carrier CA of the planetary gear device 30, and Y3 indicates the relative rotational speed of the sun gear S of the planetary gear device 30. In FIG. 4 and FIG. 5, the relative rotational speed of the three rotation elements in the planetary gear device 30 is indicated by a solid line L1. A space between two each of the vertical lines Y1 to Y3 is defined in accordance with the gear ratio ρ of the planetary gear device 30.

In FIG. 4, FIG. 5, and FIG. 12, torque (drive power) that is generated on the ring gear as the output member in a manner corresponding to the torque output from the second electric motor MG2 is indicated by a blank white arrow on the vertical line Y1. The torque output from the first electric motor MG1 is indicated by a blank white arrow on the vertical line Y3, and torque that is generated on the ring gear R in a manner corresponding to the torque is indicated by a black arrow on the vertical line Y1. FIG. 4 illustrates the control in this embodiment in the case where the vehicle speed V obtains the value that falls within the range immediately before the stop of the vehicle due to the speed reduction of the vehicle during the forward travel in the exclusive mode in the EV travel mode and in the case where the start of the engine 12 is predicted. As shown in FIG. 4, in the case where the start of the engine 12 is predicted, the hybrid drive control section 82 causes the first electric motor MG1 to generate the torque in the positive rotational direction. That is, the specified backlash filling torque is applied in the positive rotational direction of the first electric motor MG1. In other words, in order to crank the engine 12, the backlash filling torque is output in the same direction as a direction of the torque to be output from the first electric motor MG1. That is, with the direction of the backlash filling torque that is output from the first electric motor MG1 being the positive rotational direction, the direction of the torque by the first electric motor MG1 during cranking of the engine 12 is corresponded thereto. In this way, the start (cranking) of the engine 12 is smoothly initiated, and generation of the abnormal sound at the start of the engine can be suppressed.

FIG. 5 illustrates the control in this embodiment in the case where the vehicle speed V obtains the value that falls within the range immediately before the stop of the vehicle due to the speed reduction of the vehicle during the forward travel in the exclusive mode in the EV travel mode and in the case where the start of the engine 12 is not predicted. As shown in FIG. 5, in the case where the start of the engine 12 is not predicted, the hybrid drive control section 82 causes the first electric motor MG1 to generate the torque in the negative rotational direction. That is, the specified backlash filling torque is applied in the negative rotational direction of the first electric motor MG1. In other words, the backlash filling torque that applies the torque in the same direction as the drive power corresponding to the torque output from the second electric motor MG2 to the ring gear R as the output member is output. That is, with the direction of the backlash filling torque that is output from the first electric motor MG1 being the negative rotational direction, the torque in the positive rotational direction is applied to the ring gear R as the output member. In this way, generation of energy loss can be suppressed, and thus the fuel economy can be improved. In addition, the generation of the abnormal sound at the start of the engine can be suppressed.

FIG. 12 illustrates the control in this embodiment in the case where the vehicle speed V obtains the value that falls within the range immediately before the stop of the vehicle during the reverse travel in the exclusive mode in the EV travel mode. As shown in FIG. 12, in the case where the vehicle speed V obtains the value that falls within the range immediately before the stop of the vehicle during the reverse travel in which the second electric motor MG2 is exclusively used as the drive source, the hybrid drive control section 82 causes the first electric motor MG1 to generate the torque in the positive rotational direction. That is, the specified backlash filling torque is applied in the positive rotational direction of the first electric motor MG1. In other words, the backlash filling torque that applies the torque in the same direction as the drive power corresponding to the torque output from the second electric motor MG2 for the reverse travel to the ring gear R as the output member is output. That is, with the direction of the backlash filling torque that is output from the first electric motor MG1 being the positive rotational direction, the torque in the negative rotational direction is applied to the ring gear R as the output member. In this way, the generation of the energy loss can be suppressed, and thus the fuel economy can be improved.

Figure 13:
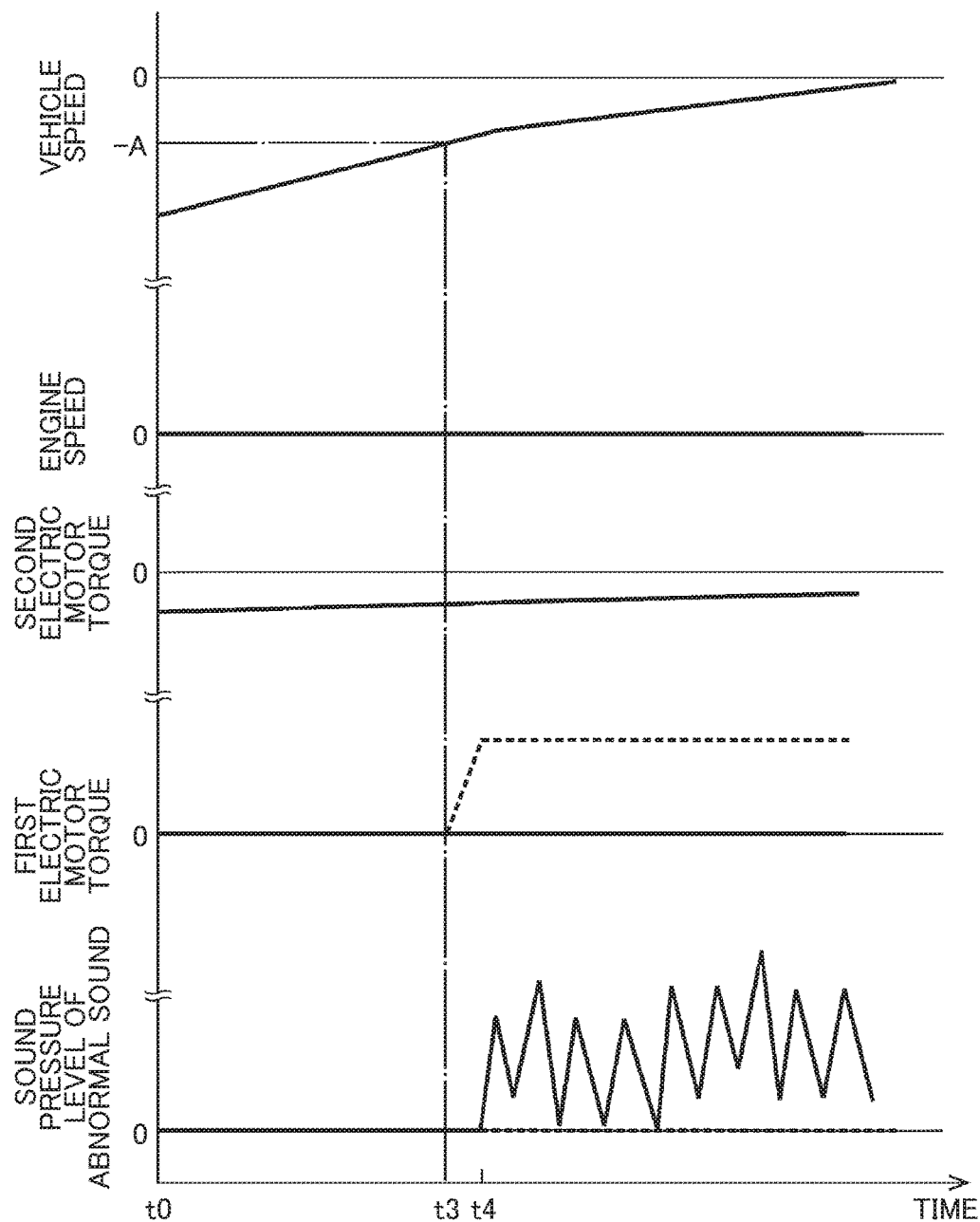
FIG. 13 is a time chart for illustrating one example of the control in this embodiment during the reverse travel by the electronic control unit in FIG. 2.

FIG. 13 is a time chart for illustrating one example of the control in this embodiment in the case where the absolute value of the vehicle speed V becomes lower than the absolute value of the vehicle speed A immediately before the stop of the vehicle during the reverse travel in the exclusive mode in the EV travel mode. In FIG. 13, a waveform that corresponds to the conventional control is represented by a solid line, while a waveform that corresponds to the control in this embodiment is represented by a broken line. In the control shown in FIG. 13, the travel in the exclusive mode in the EV travel mode, that is, the reverse travel in which the second electric motor MG2 is exclusively used as the drive source among the engine 12, the first electric motor MG1, and the second electric motor MG2 is made. That is, the engine 12 is stopped, and the speed Ne thereof is zero. Preferably, the locked state where the meshing clutch 46 is engaged and thus the crankshaft 26 of the engine 12 is fixed (locked) to the housing 28 as the non-rotation member is set. From the time point t0 to a time point t3, the first electric motor torque Tmg1 that is output from the first electric motor MG1 is zero. That is, the first electric motor MG1 is rotated with no load. The second electric motor torque Tmg2 that is output from the second electric motor MG2 as the drive source is linearly increased (an absolute value of the torque is linearly decreased), and the vehicle speed V is gradually decreased to zero. That is, the speed reducing travel is made. At the time point t3, the absolute value of the vehicle speed V becomes lower than the vehicle speed A immediately before the stop of the vehicle due to the speed reduction of the vehicle. That is, the vehicle speed V falls within the range immediately before the stop of the vehicle, which is the speed range lower than the vehicle speed A immediately before the stop of the vehicle.

In the conventional control indicated by the solid line in FIG. 13, the first electric motor torque Tmg1 remains zero even after the vehicle speed V obtains the value that falls within the range immediately before the stop of the vehicle at the time point t3. In this case, in the conventional control, the tooth hammering sound (the rattling sound) is generated around the planetary gear device 30 that is coupled to the first electric motor MG1 due to the cogging torque in the first electric motor MG1, for example, near a time point t4. Meanwhile, in the control of this embodiment indicated by the broken line in FIG. 13, the first electric motor torque Tmg1 is increased after the vehicle speed V obtains the value that falls within the range immediately before the stop of the vehicle at the time point t3. Then, after the first electric motor torque Tmg1 is increased to a specified value at the time point t4, such torque is maintained. This torque corresponds to the backlash filling torque for filling the backlash in the configuration around the planetary gear device 30 that is coupled to the first electric motor MG1. In the control of this embodiment, in the case where the vehicle speed V obtains the value that falls within the range immediately before the stop of the vehicle, the backlash filling torque is output from the first electric motor MG1 (such torque is applied by the first electric motor MG1). In this way, similar to a time of the forward travel that is described above by using FIG. 3, the generation of the tooth hammering sound around the planetary gear device 30 can be suppressed.

Figure 6:
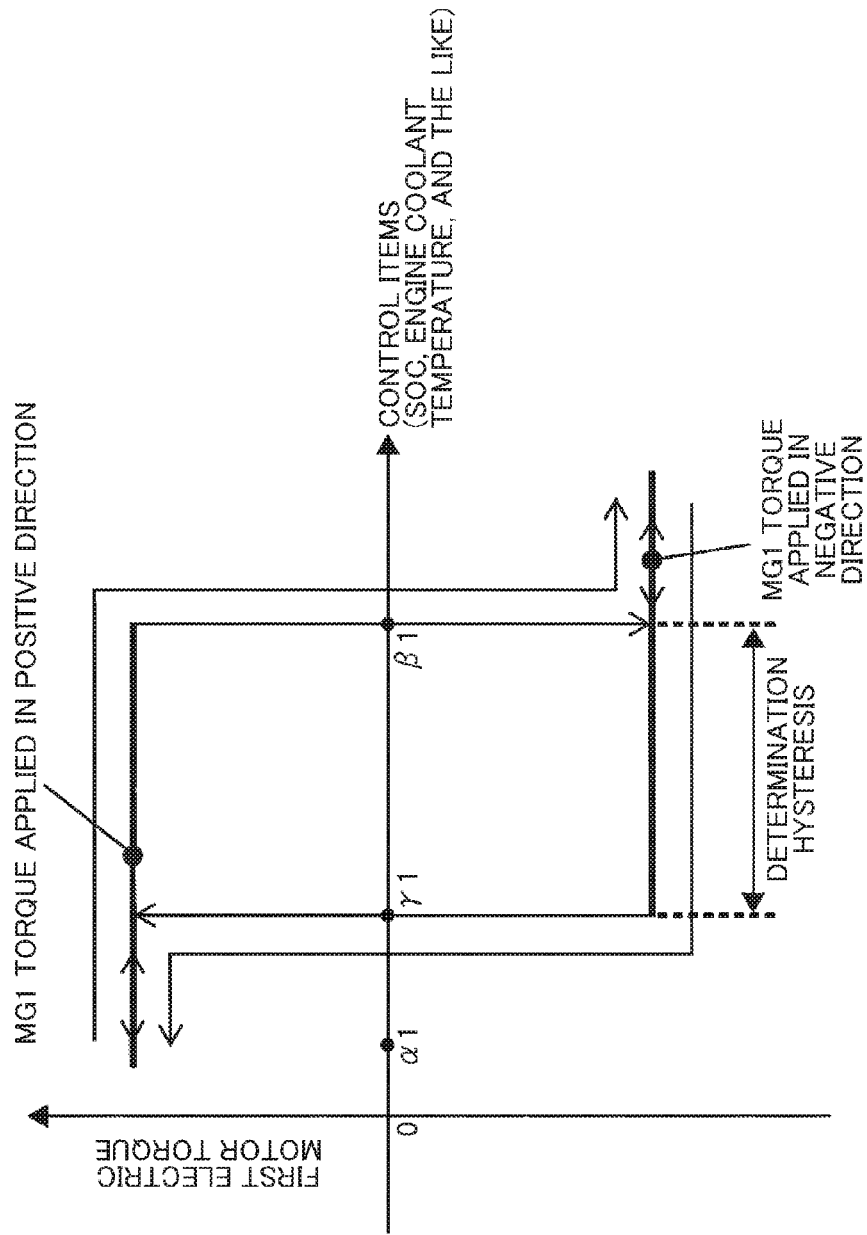
FIG. 6 is a graph for illustrating the control in this embodiment in detail in the case where the vehicle speed becomes lower than the predetermined value due to the speed reduction of the vehicle during the EV travel.

FIG. 6 is a graph for illustrating the control in this embodiment in detail in the case where the vehicle speed V obtains the value that falls within the range immediately before the stop of the vehicle due to the speed reduction of the vehicle during the travel in the exclusive mode in the EV travel mode, and exemplifies a hysteresis related to torque control of the first electric motor MG1. As examples of control items shown in FIG. 6, the state of charge SOC of the electric power storage device 52, the coolant temperature Te of the engine 12, and the like are raised. In FIG. 6, $\alpha 1$, $\beta 1$, $\gamma 1$ are values of the control items, each of which serves as a switching reference of the drive state of the engine 12, and have a relationship of $\alpha 1 < \gamma 1 < \beta 1$. In the control shown in FIG. 6, the engine 12 is started in the case where the value of the control item becomes at most equal to $\alpha 1$ in the state where the engine 12 is stopped. The driving of the engine 12 is stopped in the case where the value of the control item becomes at least equal to $\beta 1$ in the state where the engine 12 is driven. In the case where the value of the control item becomes at most equal to $\gamma 1$, it is determined that the engine 12 is started soon (the start is predicted), and an application direction of the torque of the first electric motor MG1 is set to the positive rotational direction. That is, the direction of the torque of the first electric motor MG1 is switched from the negative rotational direction to the positive rotational direction. In the case where the value of the control item becomes at least equal to $\beta 1$, it is determined that the start of the engine 12 is not predicted, and the application direction of the torque of the first electric motor MG1 is set to the negative rotational direction. That is, the direction of the torque of the first electric motor MG1 is switched from the positive rotational direction to the negative rotational direction.

Figure 7:
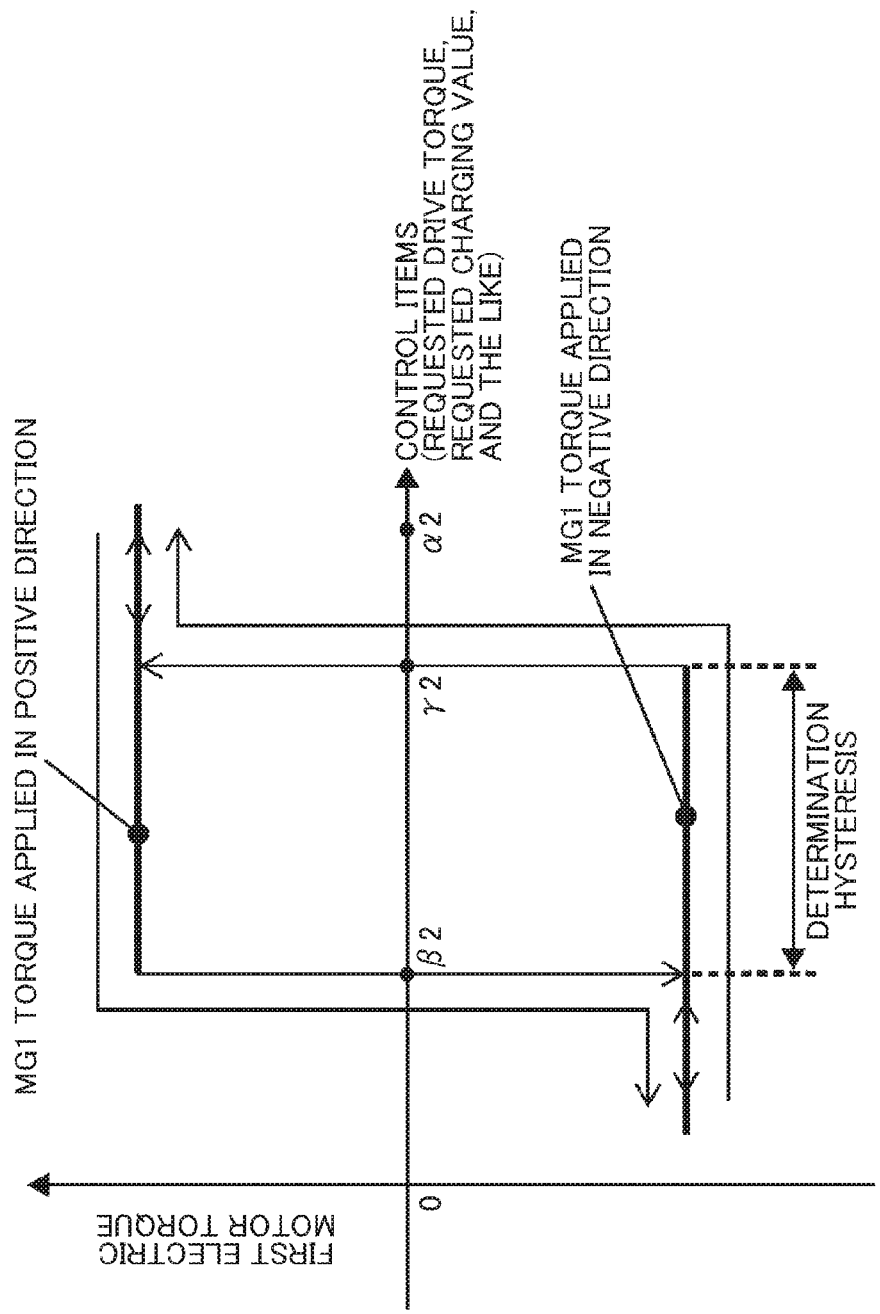
FIG. 7 is a graph for illustrating the control in this embodiment in detail in the case where the vehicle speed becomes lower than the predetermined value due to the speed reduction of the vehicle during the EV travel.

FIG. 7 is a graph for illustrating another control in this embodiment in detail in the case where the vehicle speed V obtains the value that falls within the range immediately before the stop of the vehicle due to the speed reduction of the vehicle during the travel in the exclusive mode in the EV travel mode, and exemplifies a hysteresis related to the torque control of the first electric motor MG1. As examples of the control items shown in FIG. 7, the requested drive torque, the requested charging value, and the like are raised.

In FIG. 7, $\alpha 2$, $\beta 2$, $\gamma 2$ are the values of the control items, each of which serves as the switching reference of the drive state of the engine 12, and have a relationship of $\alpha 2 > \gamma 2 > \beta 2$. In the control shown in FIG. 7, the engine 12 is started in the case where the value of the control item becomes at least equal to $\alpha 2$ in the state where the engine 12 is stopped. The driving of the engine 12 is stopped in the case where the value of the control item becomes at most equal to $\beta 2$ in the state where the engine 12 is driven. In the case where the value of the control item becomes at least equal to $\gamma 2$, it is determined that the engine 12 is started soon (the start is predicted), and the application direction of the torque of the first electric motor MG1 is set to the positive rotational direction. That is, the direction of the torque of the first electric motor MG1 is switched from the negative rotational direction to the positive rotational direction. In the case where the value of the control item becomes at most equal to $\beta 2$, it is determined that the start of the engine 12 is not predicted, and the application direction of the torque of the first electric motor MG1 is set to the negative rotational direction. That is, the direction of the torque of the first electric motor MG1 is switched from the positive rotational direction to the negative rotational direction.

Figure 8:
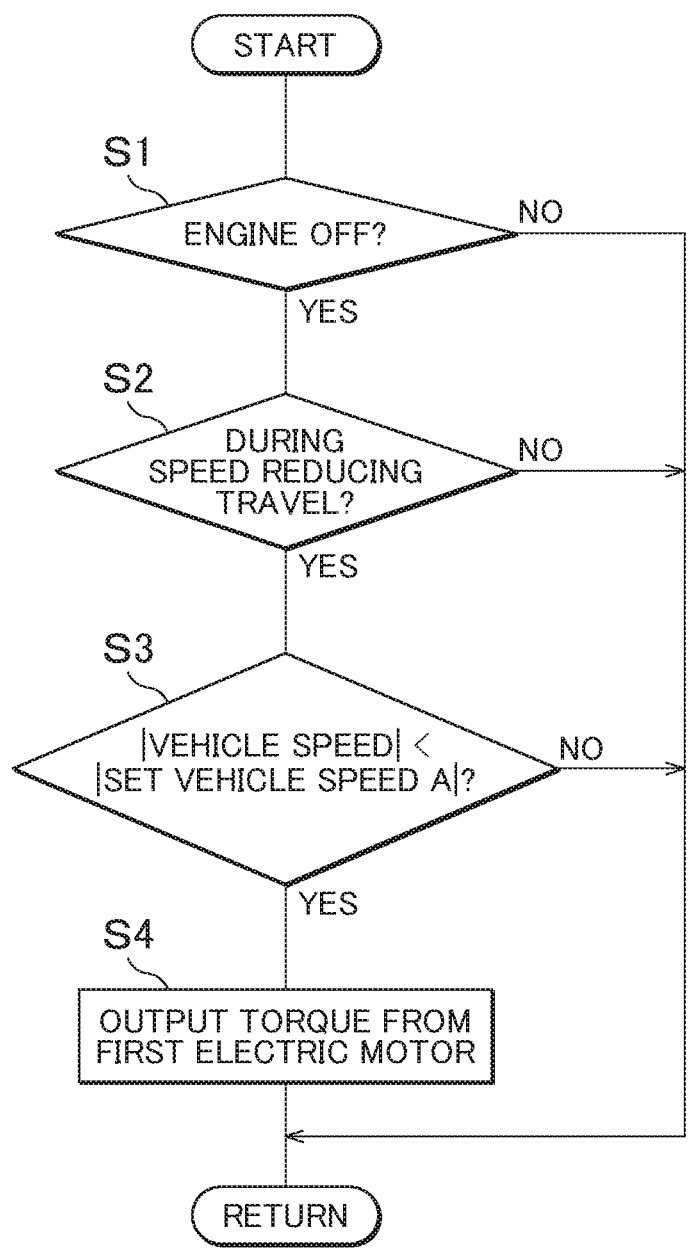
FIG. 8 is a flowchart for illustrating main sections of another example of the control in this embodiment by the electronic control unit in FIG. 2.

FIG. 8 is a flowchart for illustrating main sections of one example of the control in this embodiment by the electronic control unit 80 and is repeatedly executed.

First, it is determined in step (hereinafter step is not described) S1 whether the vehicle is in the travel state where the operation of the engine 12 is stopped and the second electric motor MG2 is exclusively used as the travel drive source, that is, whether the vehicle runs in the exclusive mode in the EV travel mode. If a determination in this S1 is negative, the current routine is terminated. On the other hand, if the determination in S1 is positive, it is determined in S2 whether the speed reducing travel is currently made on the basis of the temporal change rate of the vehicle speed V, which is detected by the output rotational speed sensor 62, and the like. If a determination in this S2 is negative, the current routine is terminated. On the other hand, if the determination in S2 is positive, it is determined in S3 whether the absolute value of the vehicle speed V that is detected by the output rotational speed sensor 62 is lower than a predetermined set vehicle speed, that is, the absolute value of the vehicle speed A immediately before the stop of the vehicle. If a determination in this S3 is negative, the current routine is terminated. On the other hand, if the determination in S3 is positive, the specified backlash filling torque is output from the first electric motor MG1 in S4. Then, the current routine is terminated.

Figure 9:
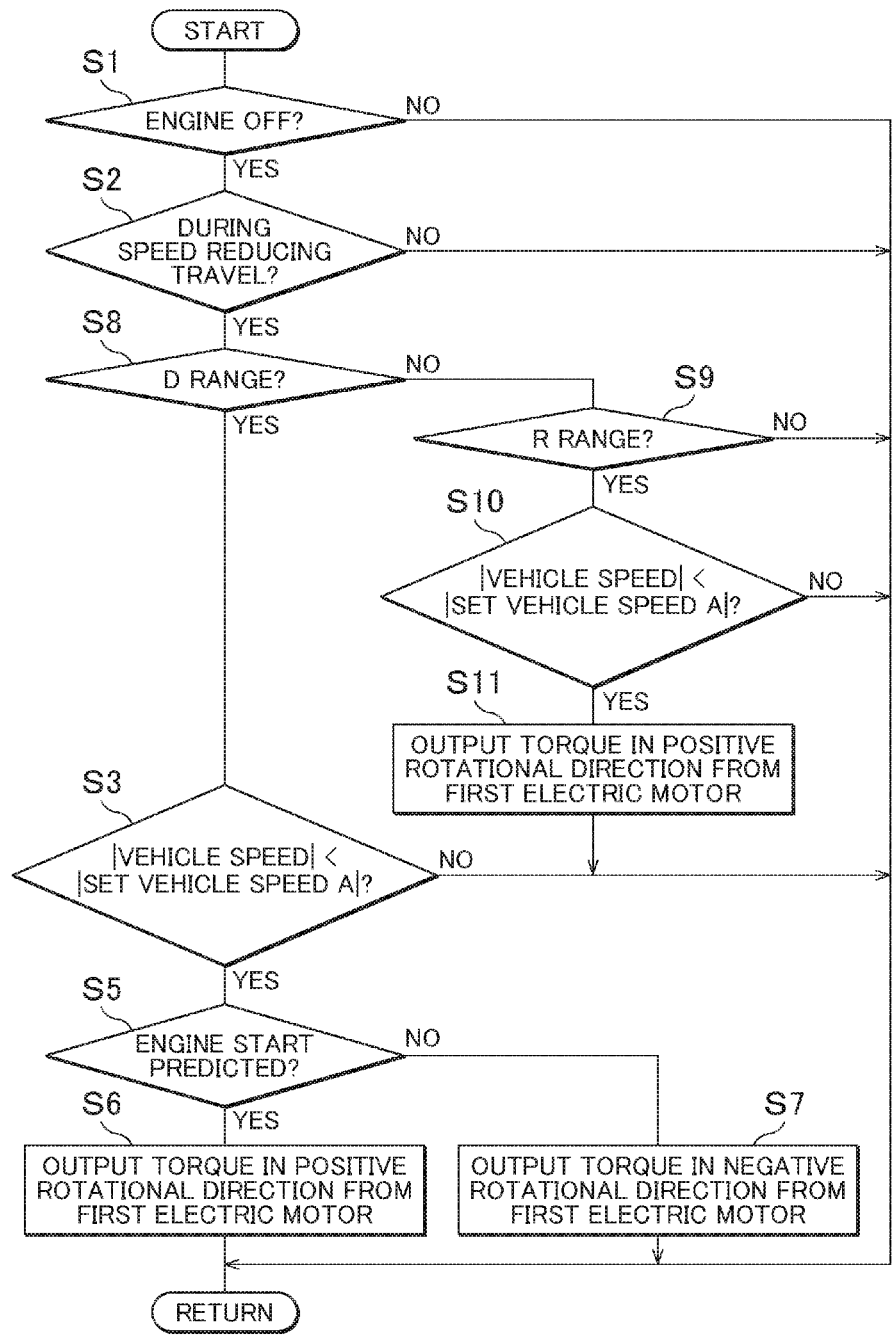
FIG. 9 is a flowchart for illustrating main sections of yet another example of the control in this embodiment by the electronic control unit in FIG. 2.

FIG. 9 is a flowchart for illustrating main sections of another example of the control in this embodiment by the electronic control unit 80 and is repeatedly executed. Regarding steps in the control shown in this FIG. 9 that are common to the above-described control shown in the FIG. 8, the same reference numerals are denoted, and the description thereof will not be made. In the control shown in FIG. 9, if the determination in S2 is positive, it is determined in S8 whether the vehicle runs in a D range that is a forward travel range. If a determination in this S8 is negative, processing in S9 onward is executed. On the other hand, if the determination in S8 is positive, the determination in S3 is made. If the determination in this S3 is positive, it is determined in S5 whether the start of the engine 12 is predicted on the basis of the coolant temperature Te of the engine 12, which is detected by the engine coolant temperature sensor 58, and the like. If a determination in this S5 is positive, the specified backlash filling torque is output in the positive rotational direction of the first electric motor MG1 in S6. Then, the current routine is terminated. On the other hand, if the determination in S5 is negative, the specified backlash filling torque is output in the negative rotational direction of the first electric motor MG1 in S7. Then, the current routine is terminated. It is determined in S9 whether the vehicle runs in an R range that is a reverse travel range. If a determination in this S9 is negative, the current routine is terminated. On the other hand, if the determination in S9 is positive, it is determined in S10 whether the absolute value of the vehicle speed V that is detected by the output rotational speed sensor 62 is lower than the predetermined set vehicle speed, that is, the absolute value of the vehicle speed A immediately before the stop of the vehicle. If a determination in this S10 is negative, the current routine is terminated. On the other hand, if the determination in S10 is positive, the specified backlash filling torque is output in the positive rotational direction of the first electric motor MG1 in S11. Then, the current routine is terminated.

As it has been described so far, in the control described above by using FIG. 8 and FIG. 9, S1 corresponds to an operation of the hybrid drive control section 82, S4, S6, S7, and S11 correspond to an operation of the first electric motor actuation control section 86, S2 corresponds to an operation of the vehicle speed reduction determination section 90, S3 and S10 correspond to an operation of the vehicle speed determination section 92, and S5 corresponds to an operation of the engine start prediction section 94.

According to this embodiment, in the case where the vehicle speed becomes lower than the specified threshold in the travel state where the second electric motor MG2 is exclusively used as the drive source among the engine 12, the first electric motor MG1, and the second electric motor MG2 and during the speed reducing travel, the torque is output from the first electric motor MG1. Accordingly, in the case where the vehicle speed is reduced during the EV travel and falls within the low vehicle speed range immediately before the stop of the vehicle, the backlash is filled by the torque that is output from the first electric motor MG1. Thus, the generation of the abnormal sound, such as the tooth hammering sound, can be suppressed. That is, the electronic control unit 80 of the power transmission apparatus 10 that suppresses the generation of the abnormal sound during the speed reducing travel can be provided.

The torque in the positive rotational direction is generated by the first electric motor MG1 in the case where the start of the engine 12 is predicted during the forward travel in which the second electric motor MG2 is used as the drive source. On the other hand, the torque in the negative rotational direction is generated by the first electric motor MG1 in the case where the start of the engine 12 is not predicted. Accordingly, the generation of the abnormal sound at the start of the engine 12 can further be suppressed. In addition, the energy loss in the case where the engine 12 is not started can be suppressed.

The torque in the positive rotational direction is generated by the first electric motor MG1 during the reverse travel in which the second electric motor MG2 is used as the drive source. Accordingly, in the case where the torque is output from the first electric motor MG1 during the reverse travel in which the second electric motor MG2 is used as the drive source, the torque in the positive rotational direction is generated, and the direction of the torque that is output from the first electric motor MG1 can correspond to the application direction of the torque to the drive wheels 14 by the second electric motor MG2. Thus, the energy loss can preferably be suppressed.

Next, a detailed description will be made on another embodiment of the present specification on the basis of the drawings. In the drawings that are used for the following description, portions that are common among the embodiments are denoted by the same reference numerals, and the description thereof will not be made.

Figure 10:
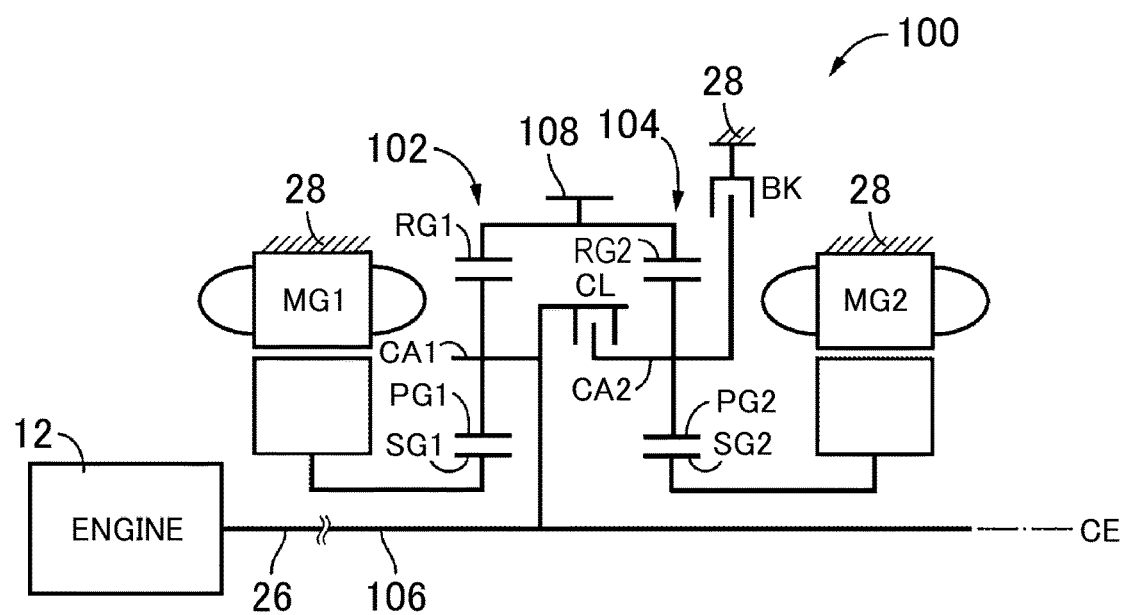
FIG. 10 is a skeletal view for exemplifying a configuration of another vehicle power transmission apparatus.

FIG. 10 is a skeletal view for exemplifying a configuration of another vehicle power transmission apparatus 100 (hereinafter simply referred to as a power transmission apparatus 100). As shown in this FIG. 10, the power transmission apparatus 100 in this embodiment is a horizontally-arranged apparatus that is used for the FF vehicle and the like, for example, and includes the engine 12, the first electric motor MG1, and the second electric motor MG2. The power transmission apparatus 100 is configured by including a first planetary gear device 102 as a first differential mechanism and a second planetary gear device 104 as a second differential mechanism on a common center axis CE. The power transmission apparatus 100 is configured to be substantially symmetrical about the center axis CE, and a lower half portion thereof from a center line is not shown in FIG. 10. The same applies to each of the following embodiments.

The first planetary gear device 102 is a planetary gear device of the single pinion type with a gear ratio of $\rho 1$ and includes as rotation elements (elements): a sun gear SG1 as a first rotation element; a carrier CA1 as a second rotation element that supports a pinion gear PG1 to allow rotation and revolution thereof; and a ring gear RG1 as a third rotation element that meshes with the sun gear SG1 via the pinion gear PG1. The second planetary gear device 104 is a planetary gear device of the single pinion type with a gear ratio of $\rho 2$ and includes as rotation elements (elements): a sun gear SG2 as a first rotation element; a carrier CA2 as a second rotation element that supports a pinion gear PG2 to allow rotation and revolution thereof; and a ring gear RG2 as a third rotation element that meshes with the sun gear SG2 via the pinion gear PG2.

The sun gear SG1 of the first planetary gear device 102 is coupled to the rotor of the first electric motor MG1. The carrier CA1 of the first planetary gear device 102 is coupled to an input shaft 106 that integrally rotates with the crankshaft 26 of the engine 12. This input shaft 106 has the center axis CE as an axis thereof, and in the following embodiments, a direction of an axis of this center axis CE is referred to as an axis direction (an axial direction) unless otherwise distinguished. The ring gear RG1 of the first planetary gear device 102 is coupled to an output gear 108 as the output rotation member and is mutually coupled to the ring gear RG2 of the second planetary gear device 104. The sun gear SG2 of the second planetary gear device 104 is coupled to a rotor of the second electric motor MG2.

The drive power that is output from the output gear 108 is transmitted to a right and left pair of drive wheels, which is not shown, via a differential gear device, an axle, and the like, which are not shown. Meanwhile, torque that is input from a travel road surface of the vehicle to the drive wheels is transmitted (input) from the output gear 108 to the power transmission apparatus 100 via the differential gear device, the axle, and the like. In this embodiment, the output gear 108 (the ring gear RG1) corresponds to the transmission member. The first planetary gear device 102 functions as the differential mechanism that distributes the output of the engine 12 to the first electric motor MG1 and the output gear 108 as the transmission member.

Between the carrier CA1 of the first planetary gear device 102 and the carrier CA2 of the second planetary gear device 104, a clutch CL for selectively engaging those carriers CA1 and CA2 (disengaging the carriers CA1 and CA2) is provided. A brake BK for selectively engaging (fixing) the carrier CA2 with the housing 28 is provided between the carrier CA2 of the second planetary gear device 104 and the housing 28 as the non-rotation member. Each of these clutch CL and the brake BK is preferably a hydraulic engagement device, an engaged state of which is controlled (which is engaged or disengaged) in accordance with the hydraulic pressure supplied from the hydraulic control circuit 54. For example, a friction engagement device of a wet multiplate type or the like is preferably used; however, an engagement device of a meshing type, that is, a so-called dog clutch (a meshing clutch) may be used. Furthermore, each of these clutch CL and the brake BK may be an electromagnetic clutch, a clutch of a magnetic power type, or the like, the engaged state of which is controlled (which is engaged or disengaged) in accordance with an electric command supplied from the electronic control unit 80.

Also in the power transmission apparatus 100 of this embodiment that is configured as described above, in the case where the vehicle speed is reduced and falls within the low vehicle speed range immediately before the stop of the vehicle in the travel state where the second electric motor MG2 is exclusively used as the drive source among the engine 12, the first electric motor MG1, and the second electric motor MG2, that is, during the EV travel, the abnormal sound, such as the tooth hammering sound, is possibly generated around the first planetary gear device 102, which is coupled to the first electric motor MG1, and the like due to the cogging torque and the like in the first electric motor MG1, for example. In this embodiment, the hybrid drive control section 82 causes the first electric motor MG1 to generate the torque in the case where the vehicle speed becomes lower than the specified threshold during the EV travel and the speed reducing travel. Preferably, the first electric motor MG1 generates the torque in the positive rotational direction in the case where the start of the engine 12 is predicted during the forward travel in which the second electric motor MG2 is used as the drive source. However, in the case where the start of the engine 12 is not predicted, the first electric motor MG1 generates the torque in the negative rotational direction. The first electric motor MG1 generates the torque in the positive rotational direction during the reverse travel in which the second electric motor MG2 is used as the drive source. In the case where the vehicle speed is reduced and falls within the low vehicle speed range immediately before the stop of the vehicle during the EV travel by such control, the backlash is filled by the torque that is output from the first electric motor MG1. In this way, the generation of the abnormal sound, such as the tooth hammering sound, can be suppressed. That is, the electronic control unit 80 of the power transmission apparatus 100 that suppresses the generation of the abnormal sound during the speed reducing travel can be provided.

Figure 11:
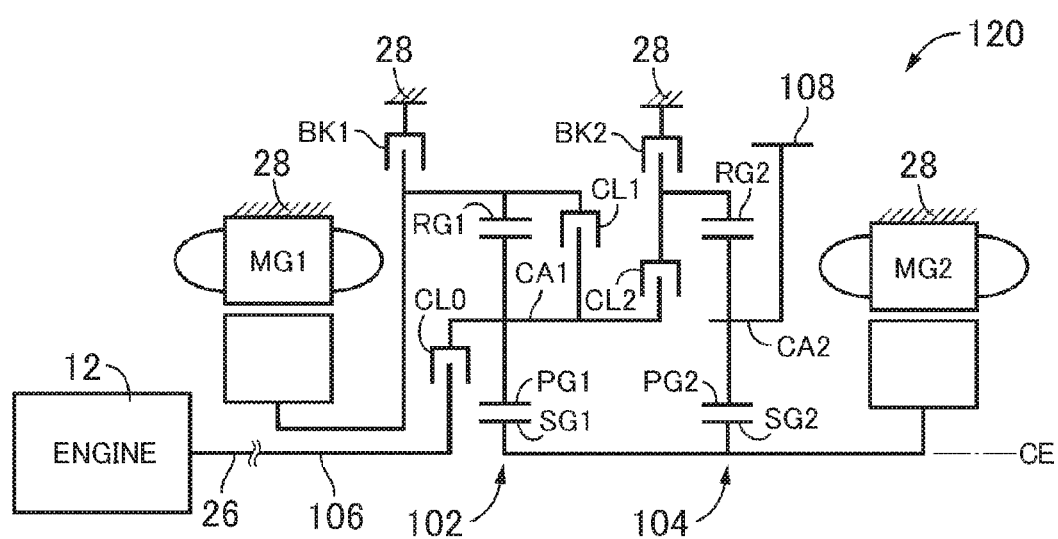
FIG. 11 is a skeletal view for exemplifying a configuration of yet another vehicle power transmission apparatus.

FIG. 11 is a skeletal view for exemplifying a configuration of yet another vehicle power transmission apparatus 120 (hereinafter simply referred to as a power transmission apparatus 120). As shown in this FIG. 11, the ring gear RG1 of the first planetary gear device 102 is coupled to the rotor of the first electric motor MG1 in the power transmission apparatus 120 of this embodiment. The carrier CA1 of the first planetary gear device 102 is coupled to the input shaft 106 via a clutch CL0. The sun gear SG1 of the first planetary gear device 102 is mutually coupled to the sun gear SG2 of the second planetary gear device 104 and is coupled to the rotor of the second electric motor MG2. The carrier CA2 of the second planetary gear device 104 is coupled to the output gear 108.

The drive power that is output from the output gear 108 is transmitted to a right and left pair of drive wheels, which are not shown, via a differential gear device, an axle, and the like, which are not shown, for example. Meanwhile, torque that is input from the travel road surface of the vehicle to the drive wheels is transmitted (input) from the output gear 108 to the power transmission apparatus 120 via the differential gear device, the axle, and the like. In this embodiment, the sun gear SG1 (the sun gear SG2) corresponds to the transmission member. The first planetary gear device 102 functions as the differential mechanism that distributes the output of the engine 12 to the first electric motor MG1 and the sun gear SG1 as the transmission member.

Between the crankshaft 26 of the engine 12 and the carrier CA1 of the first planetary gear device 102, the clutch CL0 for selectively engaging those crankshaft 26 and carrier CA1 (disengaging the crankshaft 26 and the carrier CA1) is provided. Between the carrier CA1 and the ring gear RG1 of the first planetary gear device 102, a clutch CL1 for selectively engaging those carrier CA1 and ring gear RG1 (disengaging the carrier CA1 and the ring gear RG1) is provided. Between the carrier CA1 of the first planetary gear device 102 and the ring gear RG2 of the second planetary gear device 104, a clutch CL2 for selectively engaging those carrier CA1 and ring gear RG2 (disengaging the carrier CA1 and the ring gear RG2) is provided. A brake BK1 for selectively engaging (fixing) the ring gear RG1 with the housing 28 is provided between the ring gear RG1 of the first planetary gear device 102 and the housing 28. A brake BK2 for selectively engaging (fixing) the ring gear RG2 with the housing 28 is provided between the ring gear RG2 of the second planetary gear device 104 and the housing 28.

Each of the clutches CL0, CL1, CL2 and the brakes BK1, BK2 is preferably the hydraulic engagement device, an engaged state of which is controlled (which is engaged or disengaged) in accordance with the hydraulic pressure supplied from the hydraulic control circuit 54. For example, the friction engagement device of the wet multiplate type or the like is preferably used; however, the engagement device of the meshing type, that is, the so-called dog clutch (the meshing clutch) may be used. Furthermore, each of the clutches CL0, CL1, CL2 and the brakes BK1, BK2 may be the electromagnetic clutch, the clutch of the magnetic power type, or the like, the engaged state of which is controlled (which is engaged or disengaged) in accordance with the electric command supplied from the electronic control unit 80.

In the power transmission apparatus 120, the clutch CL0 does not always have to be provided. That is, the crankshaft 26 of the engine 12 and the carrier CA1 of the first planetary gear device 102 may directly or indirectly be coupled via a damper or the like without interposing the clutch CL0. The clutch CL0 is appropriately engaged or disengaged in accordance with the travel state of the vehicle, to which the power transmission apparatus 120 is applied. However, in this embodiment, the following description will be made with an assumption that the clutch CL0 is constantly engaged. In the power transmission apparatus 120, the clutch CL1 and the brake BK1 do not always have to be provided.

Also in the power transmission apparatus 120 of this embodiment that is configured as described above, in the case where the vehicle speed is reduced and falls within the low vehicle speed range immediately before the stop of the vehicle in the travel state where the second electric motor MG2 is exclusively used as the drive source among the engine 12, the first electric motor MG1, and the second electric motor MG2, that is, during the EV travel, the abnormal sound, such as the tooth hammering sound, is possibly generated around the first planetary gear device 102, which is coupled to the first electric motor MG1, and the like due to the cogging torque and the like in the first electric motor MG1, for example. In this embodiment, the hybrid drive control section 82 causes the first electric motor MG1 to generate the torque in the case where the vehicle speed becomes lower than the specified threshold during the EV travel and the speed reducing travel. Preferably, the first electric motor MG1 generates the torque in the positive rotational direction in the case where the start of the engine 12 is predicted during the forward travel in which the second electric motor MG2 is used as the drive source. However, in the case where the start of the engine 12 is not predicted, the first electric motor MG1 generates the torque in the negative rotational direction. The first electric motor MG1 generates the torque in the positive rotational direction during the reverse travel in which the second electric motor MG2 is used as the drive source. In the case where the vehicle speed is reduced and falls within the low vehicle speed range immediately before the stop of the vehicle during the EV travel by such control, the backlash is filled by the torque that is output from the first electric motor MG1. In this way, the generation of the abnormal sound, such as the tooth hammering sound, can be suppressed. That is, the electronic control unit 80 of the power transmission apparatus 120 that suppresses the generation of the abnormal sound during the speed reducing travel can be provided.

The embodiments of the present specification have been described so far in detail on the basis of the drawings. However, the claimed subject matter is not limited to these embodiments, and the claimed subject matter is implemented by adding various changes thereto within the scope that does not depart from the gist thereof.

What is claimed is:

1. A control device for a vehicle, the vehicle including:
    an engine;
    drive wheels;
    a first electric motor provided in a power transmission path between the engine and the drive wheels;
    a second electric motor provided in the power transmission path;
    a transmission member provided in the power transmission path, the transmission member coupled to the drive wheels and the second electric motor such that power transmits; and
    a differential mechanism provided in the power transmission path, the differential mechanism configured to distribute output of the engine to the first electric motor and the transmission member, the control device comprising:
    an electronic control unit configured to maintain a stop of the engine, cause the first electric motor to generate torque, and reduce a vehicle speed, when the vehicle speed becomes lower than a specified threshold in a travel state where the engine is stopped, the torque outputted from the first electric motor is zero and the second electric motor is exclusively used as a drive source among the engine, the first electric motor, and the second electric motor and during a speed reducing travel.

2. The control device according to claim 1, wherein the electronic control unit is configured to:
    i) cause the first electric motor to generate the torque in a positive rotational direction when a start of the engine is predicted during a forward travel in which the second electric motor is used as the drive source, and
    ii) cause the first electric motor to generate the torque in a negative rotational direction when the start of the engine is not predicted.

3. The control device according to claim 1, wherein the electronic control unit is configured to cause the first electric motor to generate the torque in a positive rotational direction during a reverse travel in which the second electric motor is used as the drive source.

4. The control device according to claim 1, wherein the electronic control unit is configured to maintain the stop of the engine, cause the first electric motor to generate torque, and reduce the vehicle speed such that a generation of a tooth hammering sound around a differential mechanism is suppressed.

* * * * *